United States Patent [19]
Sprick et al.

[11] 3,752,520
[45] Aug. 14, 1973

[54] CONTAINER DOOR LATCH

[75] Inventors: Walter F. Sprick; Oscar W. Meller, both of Akron, Ohio

[73] Assignee: Goodyear Aerospace Corporation, Akron, Ohio

[22] Filed: Oct. 27, 1971

[21] Appl. No.: 201,590

[52] U.S. Cl................. 292/148, 292/152, 292/302
[51] Int. Cl............................................. E05c 1/04
[58] Field of Search.................. 292/145, 146, 147, 292/148, 149, 150, 151, 152, 153, 154, 175, 302, DIG. 14, 140, 162; 70/432, 104; 24/211 K; 85/8, 6; 402/63

[56] References Cited
UNITED STATES PATENTS

| | | | |
|---|---|---|---|
| 868,473 | 10/1907 | Palmer | 287/20.927 |
| 2,898,659 | 8/1959 | Shoemaker | 249/191 |
| 3,365,224 | 1/1968 | Thome | 287/20.924 |
| 3,506,371 | 4/1970 | Nes | 402/63 |
| 3,645,162 | 2/1972 | Welch | 85/4 |
| 125,502 | 4/1872 | Taynton | 25/211 K |
| 2,749,165 | 6/1956 | Coulter | 292/171 |
| 3,649,060 | 3/1972 | Ruff | 292/147 |
| 741,685 | 10/1903 | Lindgren | 70/81 |
| 3,126,218 | 3/1964 | Andrews | 292/175 |

Primary Examiner—Albert G. Craig, Jr.
Attorney—J. G. Pere

[57] ABSTRACT

A latch for securing a pair of members in fixed relation relative to one another. One of the members carries a stud which has a frusco-conical head portion and an annular groove. The other member carries a sliding latch plate which has a U-shaped notch at one end. The latch plate is slidably received in a housing and is movable between a closed position in which the U-shaped notch of the latch member engages the annular groove of the stud and an open position in which the latch member is clear of the stud.

10 Claims, 7 Drawing Figures

PATENTED AUG 14 1973 3,752,520
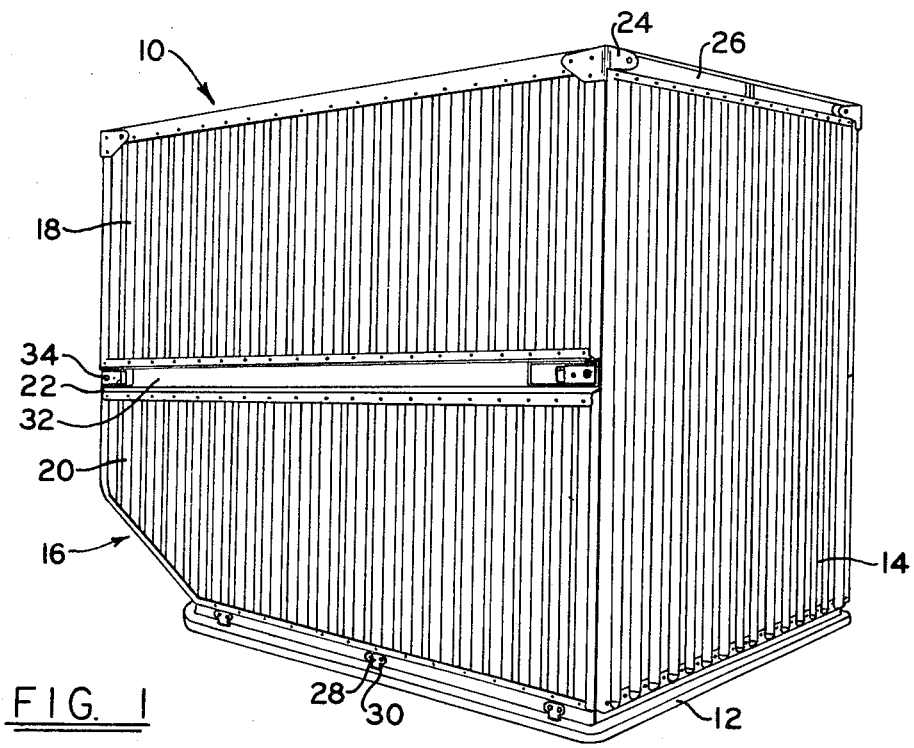
FIG. 1
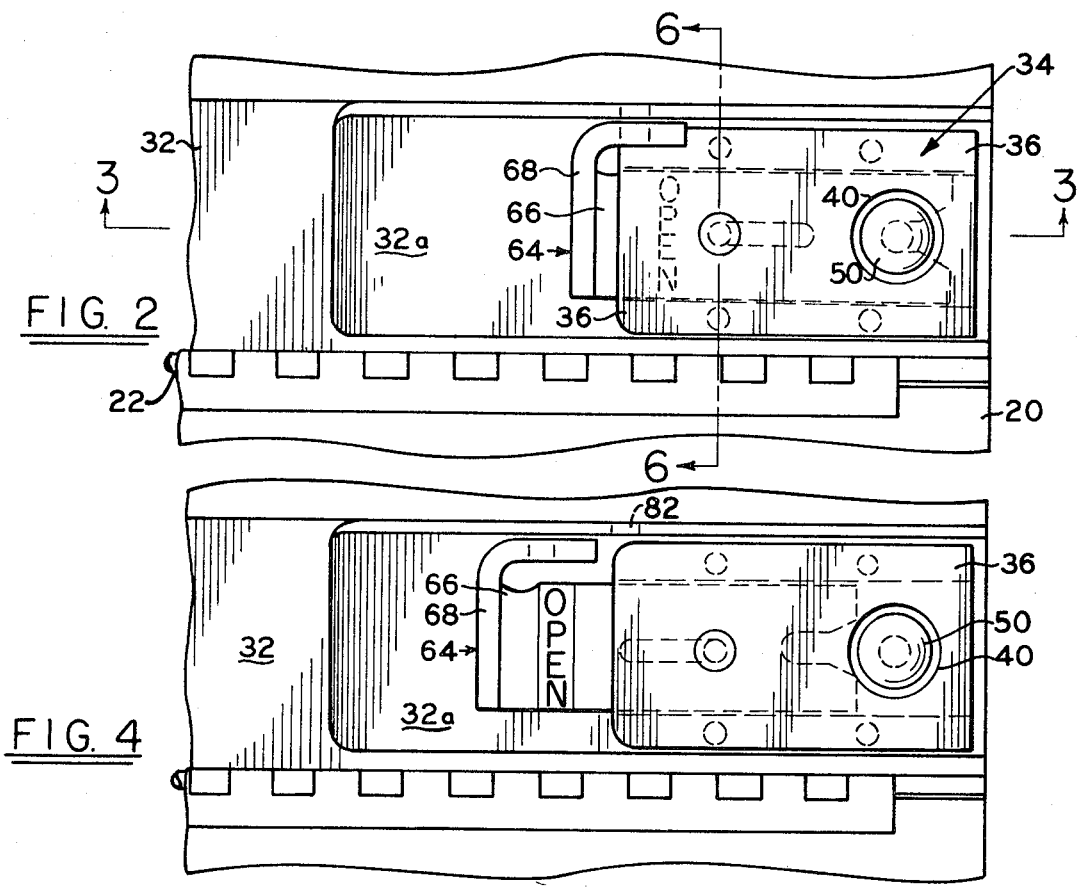
FIG. 2
FIG. 4

CONTAINER DOOR LATCH

The present invention relates to a latch assembly and more particularly to an improved latch assembly for a cargo container door.

The latch mechanisms employed in cargo containers must meet a number of stringent requirements. Such latches must be easily operated but so designed that they are not likely to be accidently knocked open. The latch must also have sufficient holding strength to retain the door in a closed position even if the door is battered, for example by shifting cargo within the container. Such latches should also, preferably, be capable of operating even if there is some misalignment between the two latching members. It is also desired that the latch provide a readily visible indication when it is in the locked or unlocked state.

While various latch constructions have been proposed and used in the past, such latches have generally been of complex construction to meet the above requirements. They are, therefore, expensive to manufacture and require frequent adjustment to assure reliable and secure latching operation.

It is the primary object of the present invention to provide a latching mechanism which is of simple design and operation and which provides for the secure latching of the members being secured.

Another object of the present invention is the provision of a latching mechanism which, while being easy to operate, is not subject to being accidently opened.

A still further object of the present invention is the provision of a laching mechanism which includes means whereby the latching mechanism may be padlocked or sealed when in its closed state.

Another object of the present invention is the provision of a latching mechanism which provides a readily visible indication when the latch is in its open condition.

The above and other objects of the invention which will become apparent in the following detailed description are achieved by providing a latching mechanism for securing two hinged members to one another which consists, essentially, of a stud secured to one of the hinged members and having a frusco-conical head portion and an annular groove immediately behind the head portion and a latch plate carried slidably in a housing mounted on the other hinged member and adapted to engage the annular groove and the stud when in a closed position.

For a more complete understanding of the invention and the objects and advantages thereof reference should be had to the following detailed description and the accompanying drawings wherein there is shown a preferred embodiment of the invention.

In the drawing:

FIG. 1 is a perspective view of a cargo container equipped with the latches of the present invention;

FIG. 2 is a fragmentary elevational view of the door assembly of the container, showing the latch mechanism of the present invention;

FIG. 4 is a fragmentary elevational view similar to that of FIG. 2 but showing the latch in its open state;

Figure 3:
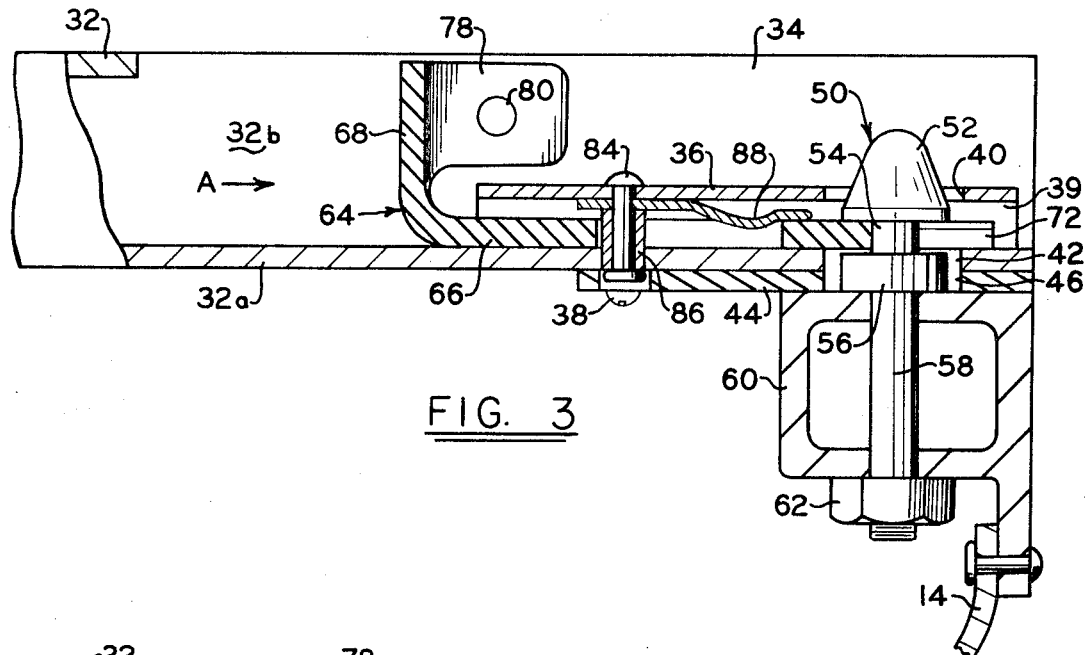
FIG. 3 is a fragmentary transverse sectional view taken along the line 3—3 of FIG. 2.

Referring now to FIG. 1, there is shown a cargo container 10 which has a base 12, a top wall, opposite end walls 14 and side walls 16. The two side walls 16 are doors which may be opened to provide access to the interior of the container 10. Each of the doors consists of an upper door section 18 and a lower door section 20 which are joined by a hinge 22. Rollers 24 connected to the upper ends of the doors on opposite corners thereof and engage tracks 26 extending the length of the end walls 14 of the container. This arrangement permits the doors to be folded along the hinge 22 and then positioned on the top of the container providing open access to the entire side of the container. Pins 28 projecting from the lower end of the doors engage openings 30 in the base 12 when the door is in its closed position. In order to lock the doors in their closed positions there is provided, at opposite ends of the horizontal reinforcing beam 32, latch mechanisms 34. These mechanisms 34 will be described in greater detail below. The construction of the container 10 and the doors 16 is described in greater detail in application Ser. No. 192,451, filed Oct. 26, 1971 for Baggage and Cargo Container Door Mechanism. It should be understood, however, that while the latches 34 of the present invention are shown in conjunction with this cargo container construction, the latches may of course be used in other environments and the particular container is described only to illustrate the mounting and operation of the latches.

The latch mechanism 34 includes a housing 36 which is secured to the rail or beam 32 by means of screws 38. A through opening 39 of rectangular cross-section extends horizontally the length of the housing 36. Slidably received within this through opening 39 is a latch plate designated generally by the reference numeral 64. The latch plate 64 is illustrated in greater detail in FIG. 7 and will be further described below. The screws 38 which retain the housing 36 in place also secure a strike plate 44 on the opposite side of the web 32a or other plate to which the latch assembly is secured. It should be noted that a circular opening 40 is provided in the housing 36 adjacent one end thereof and that the web 32a and strike plate 44 are also provided with circular openings 42 and 46, respectively, which are aligned with the opening 40. These aligned openings permit passage of the latching stud 50 through the housing 36. The stud 50 is provided with a frusco-conical head portion 52, an annular recess 54, and a shoulder 56. As can be seen from FIG. 3 the shank portion 58 of the stud 50 passes through the edge rail 60 of the side wall 14 and is secured by a suitable nut 62. The stud 50 is located so that it is concentric with the openings 40, 42, and 46.

Figure 7:
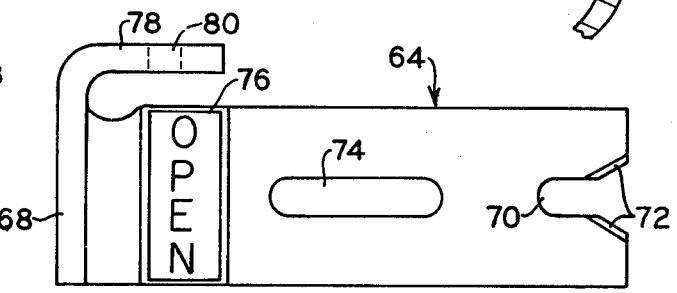
FIG. 7 is an elevational view of the latching plate employed in the assembly of the present invention.

Referring now to FIG. 7, it will be seen that the latching plate 64 has a flat body portion 66, this portion being slidably received within the opening 39 and having at its outer end a U-shaped opening 70 which is of a width only slightly greater than the diameter of the annular portion 54 of the stud 50. The outer ends of the opening 70 are beveled to provide a diverging opening and, preferably, the upper surfaces of these beveled portions 72 are chamfered. The flat portion 66 of the latch plate 64 is also provided with a slot 74 which is aligned with the U-shaped opening 70. The slot 74 is rounded at its ends and the distance between the centers of curvatures of the two ends of the slot is at least substantially equal to the distance between the center of curvature of the U-shaped slot and that of the adjacent end of the slot 74.

Figure 6:
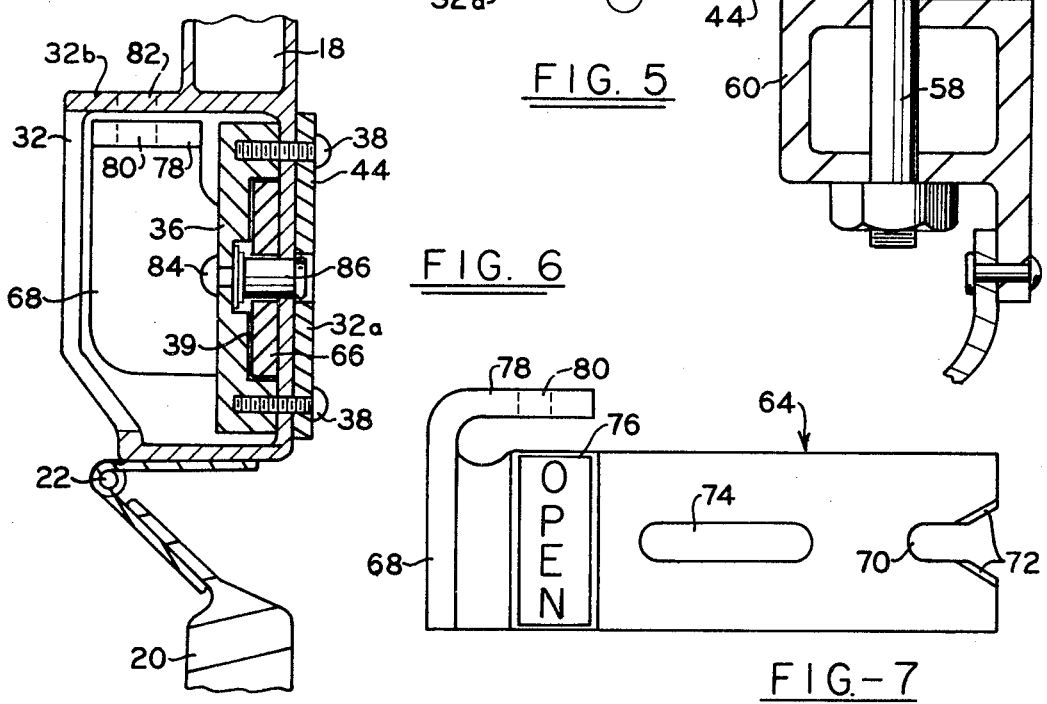
FIG. 6 is a fragmentary vertical section taken along the line 6—6 of FIG. 2.

Referring again to FIGS. 3 and 6, it will be seen that a rivet or pin 84 secured to the housing 36 carries a sleeve 86 passes through the slot 74 of the latching plate 64. This sleeve 86 serves as a stop member, limiting the inward and outward movement of the slide plate 64. A spring 84 is secured by the sleeve 86 and rivet 84 and also engages the slot 74 to releasably hold the sliding plate either in its open or closed position.

It will be noted that the latching plate 64 is provided with an end portion 68 extending at right angles to the main portion 66 of this plate. and at the end opposite from the U-shaped notch 70. This upwardly projecting end portion 68 provides a handle by which the latch plate 64 may be moved inwardly and outwardly. A tab-like portion 78 may also be provided extending at right angles to the handle portion 68 and parallel to one of the webs 32b of the beam 32. This tab portion 78 is provided with a hole 80 and the parallel web portion 32b is provided with a hole 82 which is aligned with the hole 80 when the latch is in its closed position. This arrangement permits the latch to be padlocked or sealed, for example with a customs seal, when closed.

The latch is illustrated in its closed position in FIGS. 2 and 3. As wll be seen from these figures, the latching stud 52 projects through the openings 40–42 and 46 with the annular recessed portion 54 of the stud being generally in the plane of the latch plate 64. In the latched position the latch plate 64 has been moved in the direction of the arrow A so that the annular recessed portion 54 of the stud is received within the opening 70, the diverging and chamfered ends 72 serving to guide the stud into precise alignment with the U-shaped inner portion of the opening 70. In this closed position the stop sleeve 86 is located in the end of the slot 74 furthest from the opening 70 and the spring engages the opposite end of the same opening. Since the latch plate 66 is positioned between the head portion 52 and the shoulder 56 of the stud 50, a tight latching relationship is maintained.

Figure 5:
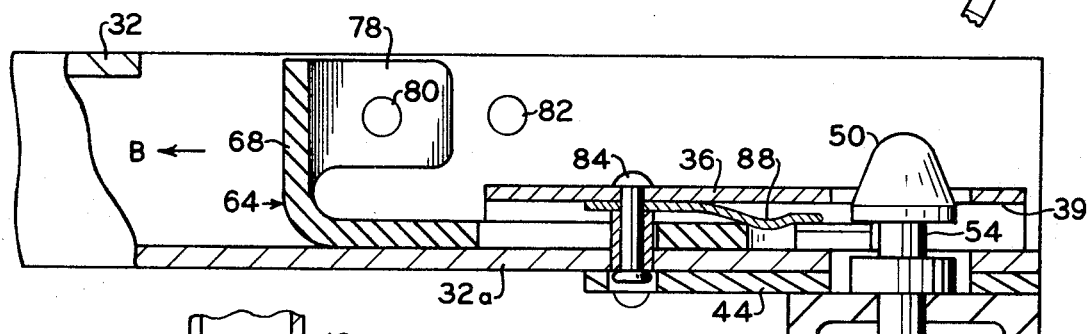
FIG. 5 is a fragmentary transverse sectional view taken along the line 5—5 of FIG. 4.

When the latch plate 64 is moved in the direction of the arrow B, as shown in FIG. 5, the opening 70 is moved away from the stud 50 so that the stud can now pass freely through the openings 40, 42, and 46. In the fully opened position of the latch plate 64 the stop sleeve 86 engages the end of the slot 74 nearest the U-shaped slot 70 and the spring 88 engages in the U-shaped slot 70 to releasably hold the lock in an open position. To provide an indication that the lock is in its open position a suitable marking 76 may be provided on the flat portion 66 of the latch plate 64 which is within the confines of the housing 36 when the latch is closed but which is exposed when the latch is moved to its open position. Preferably, this marking 76 is of a readily visible color contrasting with the remainder of the lock assembly.

In order to provide reliable operation of the assembly the stud 50 and sliding latch plate 64 may be fabricated of stainless steel. Also, the flat portion 66 of the latch plate 64 is preferably provided with a solid film lubricant coating such as tetrafloroethylene.

It should now be apparent that there has been provided an improved latching assembly which fulfills the objects initially set out above. The combination of the sliding latch plate and the latch stud provides a simple latch mechanism which is capable of withstanding substantial loads. Under normal conditions the action of the spring 88 engages either in the slot 74 or the U-shaped opening 70 is sufficient to retain the latch in either its closed or open position. However, the provision of the lug 78 provides a simple arrangement for locking or sealing the assembly to prevent accidental opening thereof. Since the head portion 52 of the locking stud 50 passes through the latch housing 36 misalignment of the stud and latch can be easily seen with visual inspection. The diverging and chamfered end portions 72 of the opening 70 will compensate for minor misalignment. If the misalignment is substantial the stud may be loosened and moved to a central position within the hole 40. This can also be done with visual alignment only.

It should be understood that while only the best known embodiment of the invention has been illustrated and described in detail herein, the invention is not limited thereto or thereby. Reference should thus be had to the appended claims in determining the true scope of the invention.

What is claimed is:

1. A latch for securing two relatively movable members in fixed relation to one another, comprising:
   a stud adapted to be secured to one of the members, the stud having an annular groove,
   a latch plate having a flat body portion with an open-ended notch at one end, the notch having a U-shaped inner portion cooperating in a close sliding engagement with the groove of the stud, the latch plate having an end portion opposite to the notch extending at right angles to the body portion to serve as a handle, and a tab portion extending at right angles to the end portion and the body portion,
   a housing adapted to be secured to the other of said members, the housing enclosing and slidably receiving the latch plate along a line perpendicular to the longitudinal axis of the stud between a first position in which the notch of the plate engages the annular groove of the stud, and a second position in which the latch plate is remote from the stud, and
   means provided to secure the tab portion of the latch plate in fixed relation to at least one of the members with the latch plate in its first position.

2. The latch according to claim 1 further including stop means carried by the housing and engaging the latch plate to determine the first and second positions.

3. The latch according to claim 2 wherein the latch plate is provided with an elongated slot extending parallel to the direction of movement of the plate, the stop member comprising a pin-like member secured to the housing and projecting into the slot.

4. The latch according to claim 3 further including means for releasably retaining the latch plate in either the first or second position.

5. The latch according to claim 4 wherein the retaining means comprises a spring carried by the housing and engaging the slot of the latch plate when the plate is in its first position and engaging the notch of the latch plate when the plate is in its second position.

6. A latch according to claim 1 where the other member includes a web portion in parallel adjacent relation to the tab portion of the latch plate, and the means to secure the tab portion to the web portion are aligned holes through said two portions with the latch in the first position, said holes adapted to receive a retaining member to maintain their aligned relation.

7. A latch according to claim 1 where the outer portion of the notch of the latch plate has diverging sides, at least one of the surfaces of the diverging sides being chamfered.

8. The latch according to claim 7 which includes a strike plate in conjunction with the housing and wherein the housing and stike plate are provided with aligned openings of substantially the same diameter therethrough permitting the head portion of the stud to pass through the strike plate and housing.

9. The latch assembly according to claim 8 where the housing and strike plate are mounted to a reinforcing beam which includes a hole of the same diameter as and aligned with the holes in the housing and strike plate through which the stud passes when passing through the holes of the strike plate and housing.

10. The latch assembly according to claim 1 wherein a portion of the latch plate which is concealed by the housing when the plate is in its first position and exposed when the plate is in its second position is provided with a readily visible marking.

* * * * *